Sept. 25, 1956 W. R. BUNCH ET AL 2,764,537
COMPOSITE ARTICLE AND METHOD OF MANUFACTURE
Filed March 31, 1954

WALTER RAY BUNCH
HAROLD W. SEARS
INVENTORS

BY Lyon & Lyon
ATTORNEYS 2,764,537

COMPOSITE ARTICLE AND METHOD OF MANUFACTURE

Walter Ray Bunch and Harold W. Sears, Los Angeles, Calif., assignors to Stillman Rubber Co., Culver City, Calif., a corporation of California Application March 31, 1954, Serial No. 420,062

5 Claims. (Cl. 204—15)

This invention relates to the production of composite articles having portions thereof formed of rubber and aluminum or aluminum alloy.

This invention is particularly directed to an anodized aluminum element having a rubber element bonded thereto, and also to a method of making such a part.

Heretofore parts for valves and other mechanical devices have been made by bonding rubber to aluminum elements after the latter had been anodized. Attempts to anodize the composite part after the rubber had been bonded into place were unsuccessful because the anodizing process caused serious damage to the rubber. It was recognized that bonding of the rubber to the aluminum element would have important advantages from a manufacturing standpoint, when the composite parts were required to have very close dimensional tolerances. However, so far as we are aware it has not been possible to achieve such manufacturing advantages because the rubber portion of the composite part deteriorated seriously during the anodizing process.

We have discovered that it is possible to anodize composite parts of this type after bonding rubber to the aluminum element if the composition of the rubber portion is sufficiently high in dielectric strength. We have found that if the rubber is compounded so that it has sufficient electrical resistance, that substantially no deterioration of the rubber occurs in the anodizing process. The explanation for this phenomenon is believed to be that the oxide coating built up on the surface of the metal element during anodizing is less conductive than the metal itself with the result that the resistance to flow of electric current through the metal element increases as the anodizing treatment progresses. If the dielectric strength of the rubber is relatively low the current will begin to flow through the rubber as the resistance of the aluminum oxide coating develops. The flow of current in the rubber produces heat and this in turn causes rapid deterioration of the rubber. Our discovery that increasing the dielectric strength of the rubber prevents deterioration of the rubber during anodizing is in agreement with this hypothesis.

The drawings illustrate a typical form of composite part for a valve.

Figure 1:
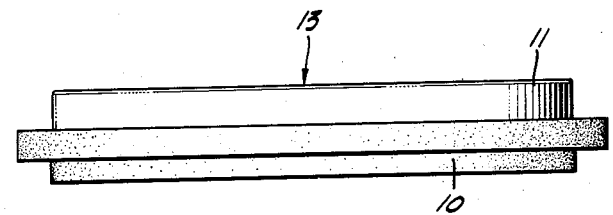
Figure 1 is a side elevation.
Figure 2:
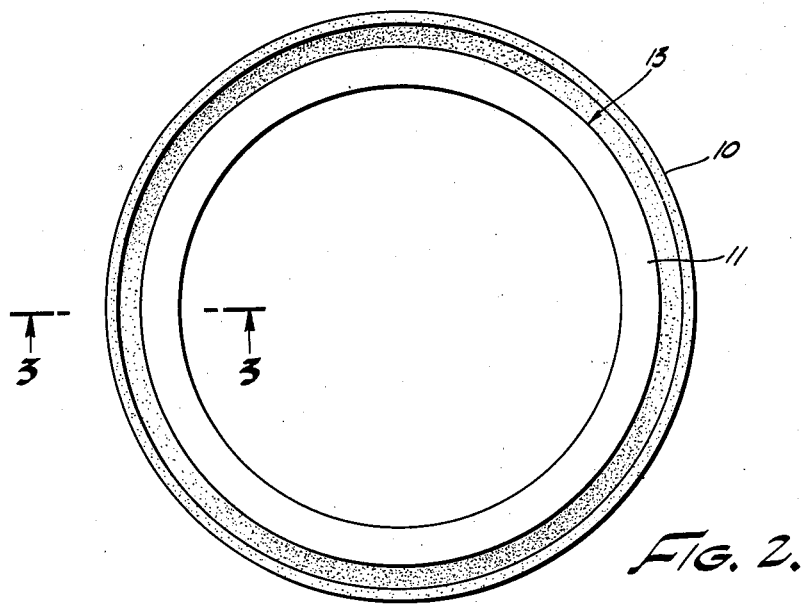
Figure 2 is a plan view.
Figure 3:
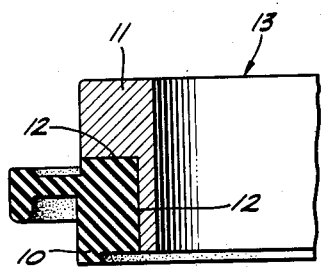
Figure 3 is a sectional elevation taken substantially on the lines 3—3 as shown in Figure 2.

The following descriptive example is set forth to illustrate how our invention may be carried into practice as applied to the sample composite part illustrated in the drawings: The formulation of the rubber is controlled so that the rubber develops relatively high electrical resistance. This may be accomplished with natural and synthetic rubbers such as, for example, Buna N and neoprene type rubbers. The silicone rubbers inherently have exceptional dielectric strength and therefore do not require special formulation. A typical formulation for any of the other types is set forth below in the following table:

| | |
|---|---|
| Rubber hydrocarbon | 100 |
| Zinc oxide | 5 |
| Stearic acid | .5 |
| Benzothiazyl disulfide (sold under trademark "Altax") | 1.5 |
| Sulfur | 1.5 |
| Antioxidant (polymerized trimethyl dihydroquinoline) | 1 |
| SRF (carbon black) | 80 |
| Clay (hard) | 20 |
| Plasticizer (dibutyl phthalate) | 20 |

The term SRF is used in the carbon industry and the rubber industry to define a carbon black made by the furnace process and excluding the conducting type furnace blacks.

It is important for developing the desired dielectric strength that the carbon black not exceed its proportionate weight of 80 parts. The proportion of 20 parts clay in combination with 80 parts maximum carbon black has been found to provide sufficient reinforcing strength to the rubber and yet produces sufficiently high dielectric strength.

The rubber 10, so formulated, is placed in a mold, not shown. The rubber 10 may be preformed, cut or stamped to the desired shape before being placed in the mold, or, alternatively may be delivered under pressure into the mold through small openings. An aluminum element 11 is also placed in the mold. Bonding of the aluminum and rubber may be accomplished mechanically if desired, such as by providing projections or depressions on the aluminum element to be encompassed by the rubber element, but we prefer to use a suitable bonding agent, such as a phenolic base cement which is both oil and fuel resistant. When the bonding agent is to be used, the surfaces 12 of the aluminum element 11 are cleaned, and are coated by the bonding agent before the aluminum element is placed in the mold. The bonding agent is allowed to dry. The rubber is then vulcanized to the aluminum in the mold under pressure and heat. The composite rubber and aluminum part generally designated 13 is then subjected to a deflashing operation by conventional tools to remove ridges and other imperfections from the surface of the rubber.

The composite part 13 is then subjected to a conventional anodizing process in a conductive bath, such as sulphuric acid or chromic acid. As a specific example, a chromic acid solution which is 5–10% acid by weight may be used. A current density of approximately 5 amperes per square foot is satisfactory. The time of treatment is about one-half hour. About 40 volts are used. A protective oxide coating is built up on the exposed surface of the metal element 11. The high dielectric strength of the rubber prevents adverse effect during the anodizing process.

After anodizing the exposed surfaces of the rubber portion 10 of the composite part may be ground to precise dimensions.

For purposes of the specification and claims it will be understood that the term aluminum includes not only pure aluminum but its common alloys which are suitable for anodizing.

Having fully described our invention it is to be understood that we do not wish to be limited to the details herein set forth but our invention is of the full scope of the appended claims.

We claim:

1. A composite part, including an aluminum element and a rubber element vulcanized and bonded thereto and covering a portion of the surface of the aluminum element, said rubber element comprising a rubber hydrocarbon and a reinforcing component selected from the group consisting of carbon black and a mixture of carbon black and clay; the quantity of carbon black not exceeding eighty parts by weight for one hundred parts by weight of rubber hydrocarbon the exposed surface of the aluminum element being anodized and the dielectric strength of the rubber element being sufficiently high to avoid any substantial deterioration during the anodizing of the aluminum element.

2. The process of making a composite part, comprising the steps of: vulcanizing a rubber composition comprising a rubber hydrocarbon and a reinforcing component selected from the group consisting of carbon black and a mixture of carbon black and clay; the quantity of carbon black not exceeding eighty parts by weight for one hundred parts by weight of rubber hydrocarbon to a portion of the surface of an aluminum element and subsequently subjecting both the rubber composition and aluminum element to an anodizing process to build up a protective oxide coating on the exposed surface of the aluminum element, the rubber composition having a dielectric strength sufficiently high to prevent any substantial deterioration during anodization of the aluminum element.

3. The process of making a composite part, comprising the steps of: vulcanizing a rubber composition to a portion of the surface of an aluminum element, said rubber composition comprising a rubber hydrocarbon and a reinforcing component selected from the group consisting of carbon black and a mixture of carbon black and clay, the quantity of carbon black not exceeding eighty parts by weight for one hundred parts by weight of rubber hydrocarbon, whereby the rubber composition has a high dielectric strength imparted thereto sufficient to prevent any substantial deterioration during anodization of the aluminum element, removing flash from the vulcanized rubber component, and subsequently subjecting both the rubber composition and aluminum element to an anodizing treatment to build up a protective oxide coating on the exposed surface of the aluminum element.

4. A composite part, including an aluminum element and a rubber element vulcanized and bonded thereto, and covering a portion of the surface of the aluminum element, the exposed surface of the aluminum element being anodized, and the rubber element having substantially the following composition:

| | |
|---|---|
| Rubber hydrocarbon | 100 |
| Zinc oxide | 5 |
| Stearic acid | .5 |
| Benzothiazyl disulfide | 1.5 |
| Sulfur | 1.5 |
| Antioxidant | 1 |
| Carbon black of the electrically non-conducting type | 80 |
| Clay (hard) | 20 |
| Plasticizer | 20 |

5. The process of making a composite part, comprising the steps of: vulcanizing a rubber element to a portion of the surface of an aluminum element, the rubber element having substantially the following composition:

| | |
|---|---|
| Rubber hydrocarbon | 100 |
| Zinc oxide | 5 |
| Stearic acid | .5 |
| Benzothiazyl disulfide | 1.5 |
| Sulfur | 1.5 |
| Antioxidant | 1 |
| Carbon black of the electrically non-conducting type | 80 |
| Clay (hard) | 20 |
| Plasticizer | 20 | and subsequently subjecting both the rubber and aluminum element to an anodizing treatment to build up a protective oxide coating on the exposed surface of the aluminum element.

References Cited in the file of this patent
UNITED STATES PATENTS

| | | |
|---|---|---|
| 1,869,041 | Bengston | July 26, 1932 |
| 2,346,658 | Brennan et al. | Apr. 18, 1944 |
| 2,448,513 | Brennan et al. | Sept. 7, 1948 |
| 2,537,433 | Waring | Jan. 9, 1951 |
| 2,647,079 | Burnham | July 28, 1953 |
| 2,681,310 | Wood | June 15, 1954 |